United States Patent Office 3,332,486
Patented July 25, 1967

3,332,486
SURFACTANT-WATERFLOODING PROCESS
John McGhee, Mannford, Okla., assignor to Cities Service Oil Company, Bartlesville, Okla., a corporation of Delaware
No Drawing. Filed June 28, 1965, Ser. No. 467,732
7 Claims. (Cl. 166—9)

This invention relates to the use of surfactants in waterflooding to increase the secondary recovery of crude oil from subterranean oil-bearing formations. More particularly, it relates to the use of the surfactant blend resulting in maximum oil recovery for any desired surfactant-waterflood system.

In the secondary recovery of oil by waterflooding, the use of surfactants to alter the interfacial tension between water and oil and to alter the wetting behaviour of these two fluids in contact with reservoir rock is well known. Workers in the field have generally sought a single, water soluble surfactant that will effect the desired alteration of properties in the oil found in any formation. It is pointed out in co-pending application S.N. 371,110 of J. A. King and J. W. McGhee, now U.S. Patent No. 3,288,213, the maximum oil recovery will only be obtained when the characteristics of the particular crude oil being recovered are matched by the characteristics of the surfactants employed in waterflooding. This is accomplished by selecting a surfactant or a blend of surfactants having a hydrophilic-lipophilic balance approximately the same as that associated with the particular crude oil-injection water system employed. As defined in the above-mentioned application, the expression "hydrophilic-lipophilic balance associated with the crude oil-injection water system" is defined as the hydrophilic-lipophilic balance of the particular blend of a selected surfactant mixture that produces the maximum amount of additional oil recovery when employed with the desired driving fluid.

This technique greatly facilitates the selection of the proper proportions in which any desired surfactant mixture should be blended to achieve maximum recovery for that particular surfactant system. This technique, however, does not indicate the particular class or combination of surfactants that would be most effective in increasing oil recovery.

It has now been discovered that certain combinations of surfactants are particularly beneficial in improving the amount of oil recovered in waterflooding operations. More specifically, it has been determined that improved results are obtained when the surfactants blended approximately at the hydrophilic-lipophilic balance associated with the crude oil-injection water system comprise non-ionic and anionic surfactants blended in an optimum weight ratio. This optimum ratio is determined empirically for the particular crude oil-injection water system employed. It has been found that many typical crude oil-injection water systems have an HLB associated therewith within the range of 9.5–9.9. For such typical systems, it has been found that the optimum oil recovery is obtained when the weight ratio of anionic to non-ionic surfactants is within the range of from about 6.5/3.5 to about 8.5/1.5.

Any commercially available anionic and non-ionic surfactants may be employed in accordance with the present invention. The characteristics of the crude oil-injection water system will determine the required hydrophilic-lipophilic balance and the optimum weight ratio of anionic to non-ionic surfactants necessary to achieve maximum recovery with the desired accommodation of surfactants.

Examples of suitable anionic surfactants that may be employed in this invention are the petroleum sulfonates of the Bryton Series sold by Bryton Chemical Company. This series includes Bryton F, molecular weight (MW) 467; Bryton Sheroscope F–430; and Bryton T, MW 500. The petroleum sulphonates of the Promor Series of Socony Mobil Oil Company may also be used. Included in this series are SS-6, MW 380; and SS-20, MW 415–30.

Illustrative of suitable non-ionic surfactants are the ethoxylated fatty amines of the Ethomeen Series of Armour and Company such as T-12, MW 365; T-15, MW 497; T-25, MW 937; and S-20, MW 719. The Ethomeens are deemed non-ionic, although they are partly cationic to the extent of their reaction with $H^+$ from water or in an acid solution. Other suitable non-ionic surfactants include the Span, Tween and Brij products of Atlas Powder Company. The Span products are sorbitan fatty acid esters, while the Tween products are ethoxylated sorbitan fatty acid esters. Samples include the monolaurate, Span 20 and Tween 20; the monopalmitate, Span 40 and Tween 40; the monostearate, Span 60 and Tween 60; the monooleate, Span 80 and Tween 80; and the trioleate, Span 85 and Tween 85. The Brij products are ethoxylated fatty alcohols such as Brij 35, a polyoxyethylene lauryl ether.

Other suitable anionic and non-ionic surfactants that may be employed in accordance with the present invention are listed by Schwartz and Perry in "Surface Active Agents," published by Interscience Publishers, Inc. (1949). Many commercially available surfactants actually consist of a mixture of related products. For purposes of this invention, any such commercially available surfactant is treated as a single surfactant rather than as a mixture.

In accordance with the present invention, the single anionic or non-ionic surfactant having approximately the same hydrophilic-lipophilic balance as that associated with crude oil-injection water system may be employed or a combination of two or more anionic or non-ionic surfactants may be blended to produce a blend having the desired balance. The single anionic and non-ionic surfactant or the surfactant blends, having the desired hydrophilic-lipophilic balance are then mixed together in the proper weight ratio corresponding to the optimum anionic/non-ionic weight ratio associated with the crude oil-injection water system. The hydrophilic-lipophilic balance of the anionic and non-ionic portions of the surfactant combination can each differ from the hydrophilic-lipophilic balance associated with the crude oil-injection water system only when the weight ratio of the anionic and non-ionic portions required to produce an overall mixture having the required balance also falls within the optimum weight ratio associated with the particular system. It is generally preferred, however, to adjust the hydrophilic-lipophilic balance of the anionic and non-ionic portions independently to the desired value and the employ sufficient amounts of each portion to achieve the optimum anionic to non-ionic ratio.

The volume and concentration of the surfactant slug are selected so as to obtain an economic balance between the amount of surfactant used and the amount of additional crude oil recovered from the reservoir. While the volume of surfactant slug is not a critical feature of the present invention, it has been found generally desirable to inject from about 1% to about 40% pore volume of the surfactant slug into the formation, with from about 1% to about 10% pore volume being preferred and from 1% to about 5% being especially preferred. For purposes of the present invention, the term "Pore Volume" is taken to mean the pore space of the formation or core being treated.

The surfactant slug that is injected into the reservoir in accordance with this invention may be either water-soluble or oil-soluble, or a mixture thereof, depending upon the hydrophilic-lipophilic balance associated with the given crude oil-injection water system. Although oil-soluble surfactants have been used to remove connate water that blocks the flow of oil toward production wells during primary production, they have not heretofore been considered desirable in waterflooding operations.

Oil-soluble surfactants may be injected into the reservoir dissolved in a slug of oil suspended in a slug of water. Water-soluble surfactants are normally injected into the reservoir in water solution. The concentration of surfactants in the slug may generally range from about 1% to about 10% by weight with from about 3% to about 10% being preferred.

The surfactant slug may be injected initially at the commencement of waterflooding operations or may be added to a reservoir previously waterflooded. It should also be noted that, in some instances, a crude oil-injection water system may have more than one hydrophilic-lipophilic balance at which maximum recovery is obtained. For example, there may be one balance in the hydrophilic range and another in the lipophilic range.

As indicated in the co-pending application S.N. 371,110 of King and McGhee, now U.S. Patent 3,288,213, various methods are known for measuring hydrophilic-lipophilic balance. Among these are the HLB number, water number, cloud point, number of ethylene oxide units and molecular weight. The HLB number provides a convenient means for selecting the proper surfactant or mixture of surfactants having a hydrophilic-lipophilic balance equal to that associated with the crude oil-injection water system. A means for determining the HLB of a surfactant is disclosed by Becher "Emulsions, Theory, and Practice," Rheinhold Publishing Corporation, N.Y. (1957), pages 189–199. The HLB number of a mixture of surfactants may be calculated simply from the weight percent and the HLB number of each component of the mixture. By mixing two or more surfactants, a blend having the required hydrophilic-lipophilic balance may be obtained. A low HLB e.g. 1–9 tends to indicate an oil-soluble substance, while a high HLB e.g. 11–20 tends to indicate a water-soluble substance.

For purposes of the present invention, it is not necessary to precisely match the hydrophilic-lipophilic balance of the surfactant blend, or the anionic and non-ionic portions thereof, to that associated with the crude oil being recovered. It is sufficient if the hydrophilic-lipophilic balance of the surfactant blend is approximately the same as that associated with the crude oil injection water system. While the permissible variation is not a critical feature of the invention, it has been found that the difference between the hydrophilic-lipophilic balance associated with the crude oil and that of the surfactant blend should not generally exceed about 0.4 HLB units.

In order to illustrate the present invention, flooding tests were conducted in a consolidated sandstone core. For each run, the core was first fully saturated with water, flooded with a Hawes crude oil, and subjected to conventional waterflood with 1–1.5 pore volumes of 5% NaCl brine. Approximately 2% pore volume of the surfactant flood having from 3–10% surfactant by weight was then injected into the core. This was followed by the injection of approximately 1–2 pore volumes of tap water. The anionic surfactant employed was Promor SS–20, which has an HLB of approximately 9.9. The non-ionic portion of the surfactant slug consisted of Tween 20 and Atlas G–672, which is a glycerol sorbitan laurate. Since Tween 20 has an HLB of 16.7 and Atlas G–672 has an HLB of 7.6, the non-ionic portion of the surfactant slug was prepared from 25 parts Tween 20 and 75 parts of Atlas G–672, thereby achieving an HLB of 9.9 for the non-ionic portion of the slug. A series of runs was made in which the ratio of anionic and non-ionic surfactants in the slug was varied. The results are set forth in Table I that follows:

TABLE I

| Percent anionic in surfactant blend: | Percent additional oil recovery (PV) |
|---|---|
| 0 | 4.8 |
| 25 | 7.4 |
| 40 | 9.6 |
| 50 | 10.4 |
| 65 | 16.3 |
| 80 | 20.5 |
| 90 | 18.6 |
| 100 | 9.5 |

From this series of runs, it can be seen that the maximum oil recovery is not obtained simply by employing a surfactant mixture blended to obtain the hydrophilic-lipophilic balance associated with the crude oil-injection water system. By employing a blend of anionic and non-ionic surfactants having the proper hydrophilic-lipophilic balance and blended so that the weight ratio of anionic to non-ionic surfactants is within a particular range peculiar to the crude oil-injection water system being processed, maximum oil recovery is achieved. For the Hawes crude, this optimum weight ratio is approximately 8 parts of anionic to 2 parts of non-ionic surfactant.

In similar fashion, additional runs were made with Hawes crude oil employing Promor SS–20 as the anionic surfactant. In one series of runs, the non-ionic surfactants employed were Span 20 and Igepal CO–530, which is nonyl phenoxy polyoxyethylene ethanol marketed by Antara Chemicals, having an HLB of 10.8. The weight ratio of Span 20 to Igepal CO–530 was 41/59, thereby resulting in an HLB of 9.9 for the non-ionic portion of the slug. Maximum additional oil recovery for this surfactant system was 4.5% PV which was obtained at an anionic to non-ionic weight ratio of approximately 8/2.

An additional series of runs was made with Hawes crude oil and Promor SS–20 as the anionic surfactant. The non-ionic surfactant employed was a blend of Igepal CO–530 and CO–710, an non-ionic surfactant with 10–11 moles of ethylene oxide. A total of 93 parts of Igepal CO–530 and 7 parts of CO–710 having an HLB of 13.6 were blended, resulting in an HLB of 11.0 for the non-ionic portion of the surfactant slug. Maximum oil recovery in this series of runs was 21.9%, which was obtained at an anionic to non-ionic weight ratio of approximately 7/3. The HLB of the surfactant slug was approximately 10.2.

A further series of runs were made employing Milham crude oil having an HLB of approximately 9.8. The anionic surfactant used was Penola 3236, an alkylaryl sulfonate. The non-ionic surfactant employed was Antara CO–430 and CO–530. The results for this series of runs is shown in Table II which follows:

TABLE II

| Percent anionic in surfactant blend: | Percent increased oil recovery (PV) |
|---|---|
| 0 | 3.3 |
| 50 | 5.2 |
| 55 | 5.9 |
| 60 | 9.5 |
| 65 | 13.1 |
| 80 | 10.3 |
| 100 | 4.2 |

This data indicates that the optimum weight ratio of anionic to non-ionic surfactants associated with the Milham crude oil is about 6.5/3.5.

It will be understood that various changes in the details that have been described herein in order to explain the nature of this invention may be made by those skilled in the art within the principle and scope of the invention as expressed in the appended claims.

Therefore, I claim:
1. A method for recovering oil from subterranean reservoirs by surfactant waterflood injection comprising:
    (a) Injecting a surfactant slug not exceeding about 40% of the formation pore volume into the formation, said slug containing not more than about 10% by weight surfactants, the surfactant slug comprising a combination of non-ionic and anionic surfactants, the non-ionic and anionic portions of the surfactant slug being blended in such proportions that the hydrophilic-lipophilic balance of the surfactant slug is approximately the same as that associated with the crude oil-injection water system and the weight ratio of anionic to non-ionic surfactants is approximately the same as the optimum anionic to non-ionic surfactant ratio associated with said crude oil-injection water system; and
    (b) Driving the surfactant slug through the formation by means of a waterflood.
2. The process of claim 1 in which the driving fluid used to drive the surfactant slug through the formation is fresh water.
3. The process of claim 1 in which the non-ionic portion of the surfactant slug is a single surfactant having a hydrophilic-lipophilic balance approximately the same as the hydrophilic-lipophilic balance associated with the crude oil-injection water system.
4. The process of claim 1 in which the non-ionic portion of the surfactant slug is a combination of non-ionic surfactants blended in such proportions that the hydrophilic-lipophilic balance of the surfactant combination is approximately the same as the hydrophilic-lipophilic balance associated with the crude oil-injection water system.
5. The process of claim 1 in which the anionic portion of the surfactant slug is a single surfactant having a hydrophilic-lipophilic balance approximately the same as the hydrophilic-lipophilic balance associated with the crude oil-injection water system.
6. The process of claim 1 in which the anionic portion of the surfactant slug is a combination of non-ionic surfactants blended in such proportions that the hydrophilic-lipophilic balance of the surfactant combination is approximately the same as the hydrophilic-lipophilic balance associated with the crude oil-injection water system.
7. The process of claim 1 in which the HLB number of the crude oil-injection water system is approximately from 9 to 10 and the weight ratio of anionic to non-ionic surfactants is from about 6.5/3.5 to about 8.5/1.5.

References Cited

UNITED STATES PATENTS

| | | | |
|---|---|---|---|
| 2,233,382 | 2/1941 | De Groote | 166—9 |
| 2,800,962 | 7/1957 | Garst | 166—9 |
| 2,812,817 | 11/1957 | Sayre | 166—9 |
| 3,056,452 | 10/1962 | Bernard et al. | 166—9 X |
| 3,096,820 | 7/1963 | Bernard | 166—9 |
| 3,288,213 | 11/1966 | King et al. | 166—9 |

OTHER REFERENCES

Becher: Emulsions, Theory and Practice, Second edition, Rheinhold Publishing Co., New York (1965) (pp. 232–234 and 247–255).

Davies, J. T. et al.: Interfacial Phenomena, Academic Press.

CHARLES E. O'CONNELL, *Primary Examiner.*

STEPHEN J. NOVOSAD, *Examiner.*